United States Patent
Hayase et al.

(10) Patent No.: US 8,155,219 B2
(45) Date of Patent: Apr. 10, 2012

(54) APPARATUS AND METHOD FOR PEAK SUPPRESSION IN WIRELESS COMMUNICATION SYSTEMS

(75) Inventors: Shigenori Hayase, Kodaira (JP); Takashi Yano, Tokorozawa (JP); Masaaki Shida, Hachioji (JP); Keisuke Yamamoto, Kokubunji (JP); Yunjian Jia, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 827 days.

(21) Appl. No.: 12/175,572

(22) Filed: Jul. 18, 2008

(65) Prior Publication Data

US 2009/0060070 A1  Mar. 5, 2009

(30) Foreign Application Priority Data

Aug. 28, 2007  (JP) .................................. 2007-220496

(51) Int. Cl.
*H04K 1/10* (2006.01)
(52) U.S. Cl. ........................................................ 375/260
(58) Field of Classification Search .................. 375/260, 375/296, 297; 455/114.2, 115.1, 129
See application file for complete search history.

(56) References Cited

U.S. PATENT DOCUMENTS

| | | | |
|---|---|---|---|
| 2008/0013646 A1* | 1/2008 | Hamada et al. | 375/297 |
| 2008/0233901 A1* | 9/2008 | Ebiko et al. | 455/114.2 |
| 2011/0075757 A1* | 3/2011 | Nishio | 375/295 |

OTHER PUBLICATIONS

R.W. Bauml, et al. Reducing the Peak-to-Average Power Ratio of Multicarrier Modulation by Selected Mapping, Electron. Letters., vol. 32, No. 22, p. 2056-2057, Oct. 1996.
S.H. Muller et al, OFDM with Reduced Peak-to-Average Power Ratio by Optimum Combination of Partial Transmit Sequences, Electron. Letters., vol. 33, No. 5, p. 368-369, Feb. 1997.
J. Armstrong, Peak-to-Average Power Reduction for OFDM by Repeated Clipping and Frequency Domain Filtering, Electron. Letters, vol. 38, No. 5, pp. 246-247, Feb. 2002.
T.C.W. Schenk, et al., Peak-to-Average Power Reduction in Space Division Multiplexing Based OFDM Systems Through Spatial Shifting, Electron. Letters, vol. 41, No. 15, pp. 860-861, Jul. 2005.

* cited by examiner

*Primary Examiner* — David C. Payne
*Assistant Examiner* — Leon-Viet Nguyen
(74) *Attorney, Agent, or Firm* — Antonelli, Terry, Stout & Kraus, LLP.

(57) ABSTRACT

A method for suppressing the peak-to-average power ratio (PAPR) while limiting deterioration in signal characteristics in wireless communication devices utilizing wireless communication methods (OFDM method, MIMO method) for multiplexing and sending multiple signals. A weight calculator unit sets a large weight for transmit signals whose channel quality is poor, relative to the weight of each base component based on the acquired channel quality. A peak detector unit detects the peak from the signal string after unitary conversion, and extracts a distortion component to apply for suppressing the peak. A peak suppression signal generation unit calculates the peak signal from the distortion component and weight of each base component, to add to each base component, and adds the peak suppression signal to each base component prior to unitary transformation.

18 Claims, 8 Drawing Sheets

APPARATUS AND METHOD FOR PEAK SUPPRESSION IN WIRELESS COMMUNICATION SYSTEMS

CLAIM OF PRIORITY

The present application claims priority from Japanese patent application JP 2007-220496 filed on Aug. 28, 2007, the content of which is hereby incorporated by reference into this application.

FIELD OF THE INVENTION

This invention relates to a communication method and communication apparatus for wireless communication systems sending multiple signals by multiplexing such as orthogonal frequency division multiplexing (OFDM) where multiple subcarrier signals are formed as discrete Fourier transforms, and Multiple-Input Multiple-Output (MIMO) where multiple signals are superimposed or multiplexed and sent from multiple antennas.

BACKGROUND OF THE INVENTION

Demand for communication systems with greater capacity in recent years has focused much attention on methods such as orthogonal frequency division multiplexing (OFDM) and multiple-Input Multiple-Output (MIMO).

In OFDM, multiple signals are formed as a waveform by Inverse Discrete Fourier Transform process (IDFT) and output from the antenna. OFDM can be considered an orthogonal basi transformation (unitary transform) operation where multiple signals arrayed along the frequency axis are converted to multiple signals along a time axis.

When generating a complex signal string $x\_0 - x\_(N-1)$ in a time region by subjecting the complex signal string $x\_0 - x\_(N-1)$ of frequency region subcarrier 0 to N−1 to the IDFT process, where the frequency region signal vector X is expressed as Formula 1 and the time region signal vector T is expressed as Formula 2, then a Fourier transform string F can be used to express the conversion from T to X as shown in Formula 3.

$$X = \begin{pmatrix} x_0 \\ \vdots \\ x_{N-1} \end{pmatrix}$$ [Formula 1]

$$T = \begin{pmatrix} t_0 \\ \vdots \\ t_{N-1} \end{pmatrix}$$ [Formula 2]

$$T = F^H X$$ [Formula 3]

Here, F is an N×N matrix whose k-th row, l-th column component $F\_k,l$ is $\exp(-j2\pi kl/N)/\sqrt{N}$ (Formula 4). The index of rows and columns in the matrix starts from 0. F is in other words made up of 0 to N−1 row, and 0 to N−1 column. The notation of vectors are also the same hereafter.

$$F_{k,l} = \frac{1}{\sqrt{N}} \exp\left(-j\frac{2\pi kl}{N}\right) \quad (0 \le k < N, 0 \le l < N)$$ [Formula 4]

Here, F is a matrix expressing the discrete Fourier transform (DFT). The H on the right shoulder of F expresses a conjugate transpose. The conjugate transpose of F is equivalent to an inverse matrix of F. The conjugate transpose of F is a matrix expressing the IDFT, and F is a unitary matrix.

Signal transmission efficiency can be boosted even in MIMO (Multiple-Input Multiple-Output) by unitary transform that treats the multiple signals as one vector and then mapping the signals in the multiple antennas. The conversion from the complex signal $y\_0$ to $y\_(M-1)$ for multiplexing, to the output signal $s\_0$ to $s\_(M-1)$ for multiple antennas M in the MIMO method is expressed in the following formulas 5, 6 and 7.

$$Y = \begin{pmatrix} y_0 \\ \vdots \\ y_{M-1} \end{pmatrix}$$ [Formula 5]

$$S = \begin{pmatrix} s_0 \\ \vdots \\ s_{M-1} \end{pmatrix}$$ [Formula 6]

$$S = VY$$ [Formula 7]

Here, V is M×M unitary matrix.

A MIMO-OFDM method that utilizes both the OFDM and MIMO methods can be applied to achieve stable or high-speed communication. In this method in the transmitter, the unitary transform is first applied to MIMO antenna mapping, and then unitary transforms applied by IDFT for the OFDM method. Here, M is assumed as the degree of multiplexing in MIMO, and N is assumed as the number of subcarriers for OFDM. The original complex signal vectors Y are made up of M number of OFDM frequency region signals X(0) to X(M−1) as shown in Formulas 8 and 9. These OFDM frequency region signals are each made up of N number of signals.

$$Y = \begin{pmatrix} X(0) \\ \vdots \\ X(M-1) \end{pmatrix}$$ [Formula 8]

$$X(m) = \begin{pmatrix} x_0(m) \\ \vdots \\ x_{N-1}(m) \end{pmatrix}$$ [Formula 9]

The output signal vector S from the antenna is made up of M number OFDM time region signals T(0) to T(M−1) as shown in Formulas 10 and 11. The OFDM time region signals are each made up of N number of signals.

$$S = \begin{pmatrix} T(0) \\ \vdots \\ T(M-1) \end{pmatrix}$$ [Formula 10]

$$T(m) = \begin{pmatrix} t_0(m) \\ \vdots \\ t_{N-1}(m) \end{pmatrix}$$ [Formula 11]

If defined as shown above, then the conversion from Y to S can be expressed as shown in Formula 12 through Formula 14.

$$A: A_{k,l} = \begin{cases} 1 & (l = N \times (k \bmod M) + \text{floor}(k/M)) \\ 0 & (\text{others}) \end{cases} \quad \text{[Formula 12]}$$

$$(0 \leq k < NM, 0 \leq l < NM)$$

$$R = \begin{pmatrix} F^H & 0 \\ & \ddots & \\ 0 & & F^H \end{pmatrix} A^H \begin{pmatrix} V(0) & & 0 \\ & \ddots & \\ 0 & & V(N-1) \end{pmatrix} A \quad \text{[Formula 13]}$$

$$S = RY \quad \text{[Formula 14]}$$

Here, A is the NM×NM sequence conversion matrix between OFDM and MIMO. V(0) to V(N−1) are the unitary matrices for the MIMO antenna mapping in each subcarrier. R is also a unitary matrix and so the signal is also formed in the MIMO-OFDM method by unitary transformation and output from the antenna.

Each element prior to unitary transformation is hereafter called the communication mode. The OFDM subcarrier is also equivalent to communication mode.

In the unitary transform, a coefficient is applied to the communication mode signal and after summing an output signal is then generated. The communication mode signals are not correlated with each other and so the signals converted by summing are signals equivalent to Gaussian noise according to the central limit theorem. The signal amplitude distribution therefore expands widely. In other words, the signal has a large Peak-to-Average Power ratio (PAPR).

A larger PAPR causes problems when designing the transmitter. First of all, a digital-to-analog converter (DAC) with a large bit width is needed for handling the wide amplitude distribution, causing problems of cost and power consumption. Secondly, the problem of non-linear distortion in the power amplifier occurs during power amplification of the analog signal after DAC. These problems are described in the following drawings.

Figure 2:
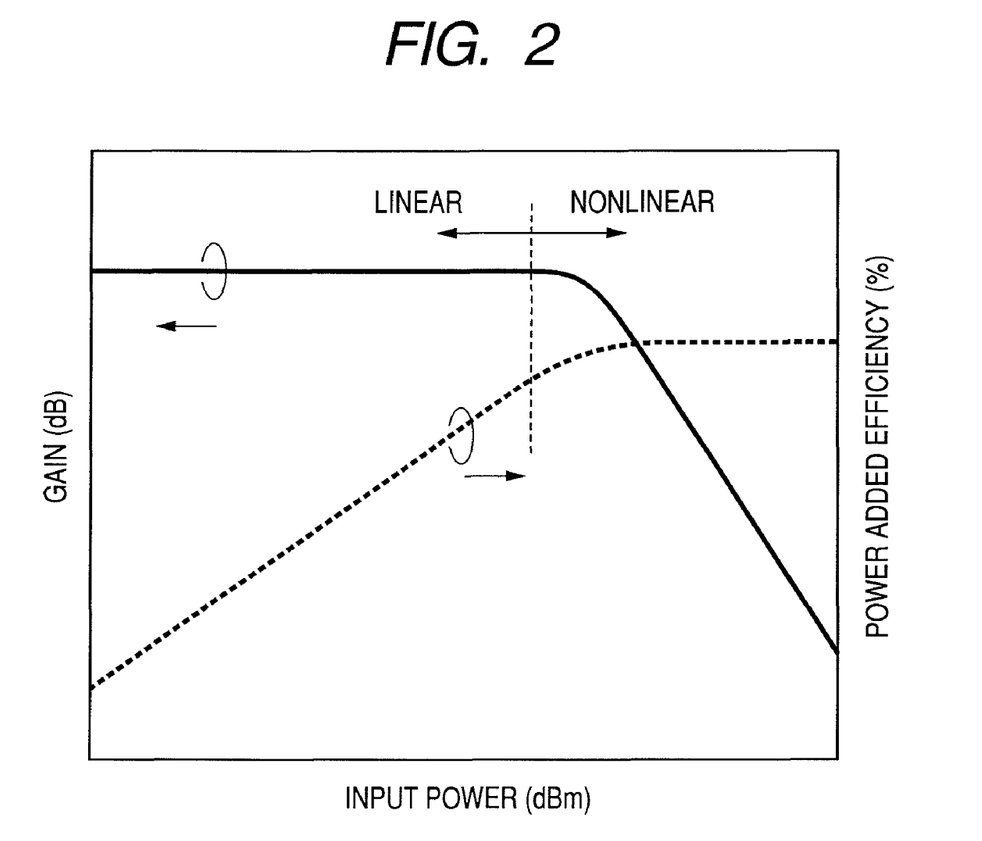
FIG. 2 is a graph showing the power added efficiency and the amplification gain versus the signal power that was input to the power amplifier.

FIG. 2 is typical graph showing the amplifier gain (vertical axis is gain on left side, solid line) for the input signal power (horizontal axis: input power) to the power amplifier; and the power added efficiency (vertical axis is power added efficiency on right side, dashed line).

A large input power is preferable since the power added efficiency becomes higher as the input signal power increases. The gain is a fixed level when within the range of the specified input signal power but the gain decreases when the input power exceeds that range and non-linear characteristic appears. The signal waveform is distorted when this non-linear effect appears, and unwanted radiation is emitted outside the signal frequency band so this nonlinear effect must be avoided. Avoiding this non-linear effect requires restricting the input signal power to a region where the gain is linear. When amplifying a large PAPR signal, the average input signal power must be reduced so the peak is in a region where gain is linear; however, this lowers the power added efficiency.

To avoid these problems methods for reducing the PAPR have been studied. R. W. Baeuml, R. F. Fischer and J. B. Huber, "Reducing the Peak-to-Average Power Ratio of Multicarrier Modulation by Selected Mapping", Electron. Lett., vol. 32, no. 22, pp. 2056-2057, October 1996, for example, discloses a selected mapping (SLM) method, and S. H. Mueller and J. B. Huber, "OFDM with Reduced Peak-to-Average Power Ratio by Optimum Combination of Partial Transmit Sequences", Electron Lett., vol. 33, no. 5, pp. 368-369, February 1997, discloses a partial transmit sequence (PTS) method. Both methods apply mutually different phase rotations to the multiple communication mode signals to reduce the peak power value. These methods require that a phase rotation quantity supplied with the transmitter be conveyed as side information to the receiver in order to demodulate (restore) the communication mode signal within the receiver. A failure when supplying this side information causes demodulation (recovery) of all signals to fail.

J. Armstrong, "Peak-to-Average Power Reduction for OFDM by Repeated Clipping and Frequency Domain Filtering", Electron. Lett., vol. 38, no. 5, pp. 246-247, February 2002 describes a clipping method. If the signal amplitude has exceeded a threshold value, then this method functions to limit the signal amplitude to the threshold value. Emissions might here radiate outside the signal frequency band so filters are utilized to eliminate components that are outside the frequency band. The filtering might generate new peaks but the technology in J. Armstrong, "Peak-to-Average Power Reduction for OFDM by Repeated Clipping and Frequency Domain Filtering", Electron. Lett., vol. 38, no. 5, pp. 246-247, February 2002 applies clipping multiple times to suppress the occurrence of new peaks.

T. C. W. Schnek, P. F. M. Smulders and E. R. Fledderus, "Peak-to-Average Power Reduction in Space Division Multiplexing Based OFDM Systems through Spatial Shifting", Electron. Lett., vol. 41, no. 15, pp. 860-861, July 2005 discloses a spatial shifting method which is a PAPR suppression method used with MIMO. This method substitutes the communication modes used for allotting the signals in order to lower the PAPR. To make optimum use of this method, side information must be conveyed to the receiver showing what communication mode to substitute. If there is a failure in supplying this side information then demodulation of all signals will fail.

SUMMARY OF THE INVENTION

This invention relates to a wireless communication apparatus for suppressing the PAPR while limiting degradation of the signal transmission efficiency in wireless communication methods for superimposing and transmitting multiple signals, such as the OFDM method for superimposing multiple subcarrier signals or the MIMO method for superimposing multiple signals and transmitting them from multiple antennas.

The methods in non-patent documents 1, 2, and 4 require the transmission of side information unrelated to the information for transmission, and therefore increase the amount of required information to communicate. The non-patent document 3 does not limit the amount of signal distortion generated in each communication mode.

In OFDM and MIMO, the communication quality is usually different in each communication mode such as the OFDM subcarrier or the MIMO stream, and the signal-to-noise ratio (SNR) obtained at the receiver is also different. Only a small amount of noise occurs in communication modes with a large SNR so a large characteristic degradation occurs when just a small amount of distortion appears. However large noise occurs in communication modes where the SNR is small, so that there is little characteristic degradation even when a large amount of distortion occurs. The method in J. Armstrong, "Peak-to-Average Power Reduction for OFDM by Repeated Clipping and Frequency Domain Filtering", Electron. Lett., vol. 38, no. 5, pp. 246-247, February 2002, therefore generates large distortion in signals of communication modes where the SNR is large, and causes large degradation in the communication characteristics.

In order to resolve the aforementioned problems, the wireless communication apparatus of this invention suppresses the amplitude of the signal by applying signal distortion to each communication mode according to the communication quality in wireless communication methods for superimposing and transmitting multiple signals, such as the OFDM method or the MIMO method.

Namely, in the wireless communication apparatus of this invention, a channel quality acquisition unit acquires the channel quality, and a weight calculation unit sets the weight for each communication mode based on the channel quality. A peak detector unit detects the peak from the signal string after unitary transformation and extracts the distortion component for added for suppressing the peak. A peak suppression signal generation unit calculates the peak suppression signal to add to each communication mode from the weight and extracted distortion component, and adds the peak suppression signal to each communication mode.

This invention is capable of suppressing the peak-to-average power ratio (PAPR) while limiting the degradation in communication characteristics to a low level, without transmitting side information.

This invention allows utilizing a low-cost ADC (analog-to-digital) with low power consumption and a small bit width. The power added efficiency of the power amplifier can also be increased and the power consumption limited.

DETAILED DESCRIPTION OF THE PREFERRED EMBODIMENTS

The wireless communication apparatus of this invention is described next while referring to the drawings.

First Embodiment

Figure 9:
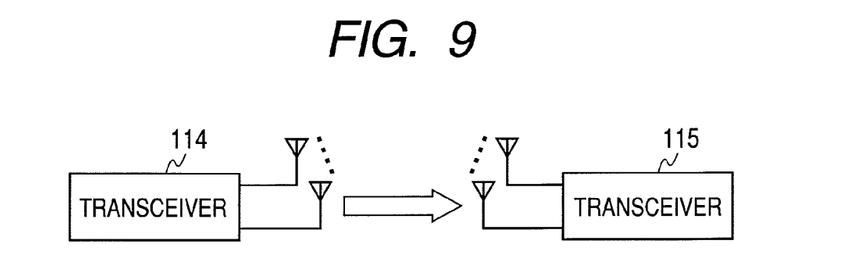
FIG. 9 is a drawing showing the communication status of the wireless communication apparatus.

The structure of the wireless communication system of this invention is shown in FIG. 9. The transceiver 114 sends data to the transceiver 115.

Figure 1:
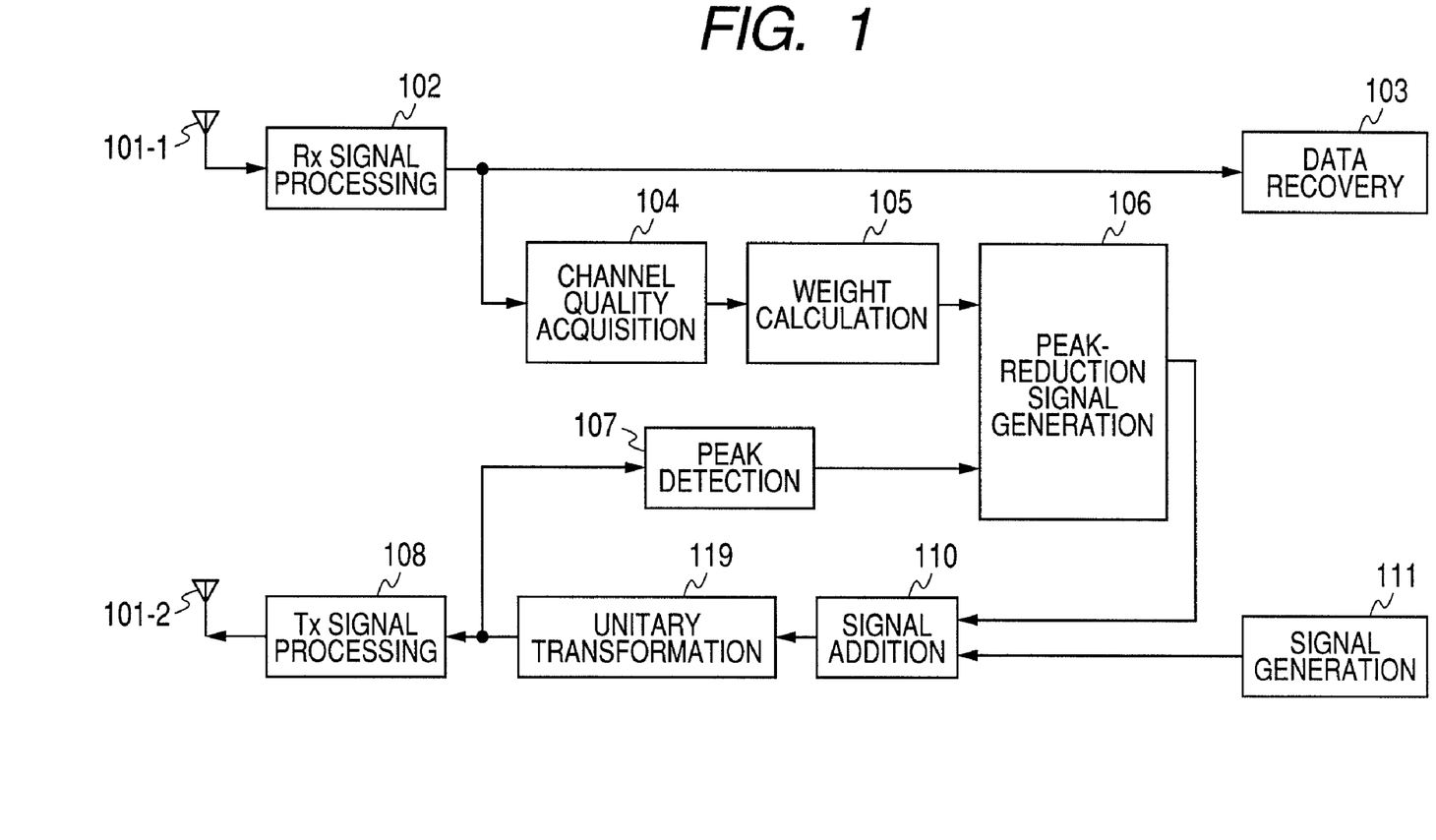
FIG. 1 is a block diagram for showing the structure of the wireless communication apparatus of this invention.

FIG. 1 shows the structure of the transceiver 114 serving as the wireless communication apparatus of this invention. This wireless communication apparatus contains a receiving antenna 101-1, a transmitting antenna 101-2, a receive (Rx) signal processing unit 102, a data recovery unit 103, a channel quality acquisition unit 104, a weight calculation unit 105, a peak suppression signal generation unit 106, a peak detection unit 107, a transmit (Tx) signal processing unit 108, a unitary transformation unit 109, a signal addition unit 110, and a signal generation unit 111.

The receiving antenna 101-1 receives the signal. The receiving antenna 101-1 need not be one unit and may include multiple units.

The receiver (hereafter Rx) signal processing unit 102 converts the received analog signal to a digital signal. The Rx signal processing unit 102 includes a filter for removing noise and interference outside the signal band from the analog data, a down converter for converting the received signal to a baseband signal, a low-noise amplifier for amplifying the power of the received signal, and an analog-to-digital converter (ADC).

The data recovery unit 103 restores the digital signal obtained at the Rx signal processing unit 102 to the data that was transmitted from the transmit source.

The channel quality acquisition unit 104 acquires the channel quality. The channel quality acquisition unit 104 for example acquires the Channel State Information described below as the channel quality.

The weight calculation unit 105 calculates the weight to allot to the peak suppression signal to be added to each communication mode, according to the channel quality information that was acquired by the channel acquisition unit 104. The specific method for making the calculation is described later on.

The signal generation unit 111 generates a signal for each communication mode.

The unitary transformation unit 109 converts each communication mode signal input by way of the signal addition unit 110 via unitary transformation into a signal for output from the antenna.

The peak detection unit 107 detects signals whose amplitude is larger than a specified threshold value from among the converted signals. A distortion component for setting this signal amplitude below the threshold amplitude is conveyed to the peak suppression signal generation unit 106.

The peak suppression signal generation unit 106 generates a peak suppression signal from the distortion component calculated by the peak detection unit 107 and the weight calculated by the weight calculation unit 105.

The signal addition unit 110 adds this generated peak suppression signal to the signal from the signal generation unit 111

By utilizing these procedures, the Tx signal processing unit 108 converts the peak-suppressed digital signal to an analog signal. The Tx signal processing unit 108 contains a DAC, a power amplifier, an up-converter for converting the baseband signal to an RF frequency, and a filter for removing unwanted emissions outside the signal band.

The transmitting antenna 101-2 converts the analog signal converted by the Tx signal processing unit 108 into electromagnetic waves. The transmitting antenna need not be one unit and may include multiple units.

The receiving antenna 101-1 and the transmitting antenna 101-2 may be structure jointly using a switch and a duplexer.

If the signal amplitude is larger than the threshold amplitude (set as C), then the peak detection unit 107 calculates a distortion component for setting the signal amplitude below the threshold amplitude. If the output signal vector S for example is expressed as the N dimension column vector, then the distortion component for the N dimension column vector can be calculated as shown in Formula 15.

$$D: D_k = \begin{cases} -(|S_k| - C)\exp(j \cdot \arg S_k) & (|S_k| > C) \\ 0 & (|S_k| \leq C) \end{cases} (0 \leq k < N) \quad \text{[Formula 15]}$$

The peak can be suppressed by adding a distortion component D to the output signal S. This method requires calculating the amplitude of a complex signal which involves a large processing load for calculating the distortion component D. However other methods (such as in Formula 16) may be employed in order to simplify that calculation, such as calculating the distortion component D from signals exceeding the respective threshold amplitudes for the real part and the imaginary part of the complex signal.

$$D: \begin{cases} \text{Re}[D_k] = \begin{cases} -(\text{Re}[S_k] - C) & (\text{Re}[S_k] > C) \\ 0 & (\text{Re}[S_k] \leq C) \end{cases} \\ \text{Im}[D_k] = \begin{cases} -(\text{Im}[S_k] - C) & (\text{Im}[S_k] > C) \\ 0 & (\text{Im}[S_k] \leq C) \end{cases} \end{cases} (0 \leq k < N) \quad \text{[Formula 16]}$$

The channel quality acquisition unit 104 acquires the quality of each communication mode. The MIMO method for example may be supplied with channel state information (CSI) as feedback for optimizing the transmission characteristics so this can be utilized as quality information.

The weight calculation unit 105 calculates the weight when allotting the distortion component to each communication mode. The propagation loss in each communication mode can be found from the CSI so if the noise occurring in each communication mode is a fixed level then that ratio can be considered the SNR for each communication mode.

Modes with a small SNR basically contain a large noise content so that noise is a more dominant factor than the distortion component in the communication speed and stability. Therefore applying a distortion component has little effect on performance. Also, applying even a small distortion component in modes with a large SNR might cause deterioration in performance because the distortion component is larger than noise.

Due to the above reasons, a small weight is set for communication modes with a large SNR, so that the distortion component will be small. In communication modes with a small SNR on the other hand, a large weight is set so that the distortion component will be large.

In view of the fact that the ratio of SNR to distortion component determines the deterioration in the communication quality, the weight of each communication mode is the inverse of square root of the SNR. A large weight is therefore set in communication modes with a low SNR. The weight is set to the square root to match the amplitude and not the power. The weight for each communication mode is expressed by the vector W of Formula 17.

$$W = \begin{pmatrix} \frac{1}{\sqrt{SNR_0}} \\ \frac{1}{\sqrt{SNR_1}} \\ \vdots \\ \frac{1}{\sqrt{SNR_{N-1}}} \end{pmatrix} \quad \text{[Formula 17]}$$

The peak suppression signal generation unit 106 allots the distortion component D obtained at the peak detection unit 107 to the communication mode based on the weight D calculated in the weight calculation unit. Setting the signal vector to add to each communication mode as B, allows finding B by the following sequence.

The N dimension signal vector Y for a communication mode is here converted to the output signal vector S by the unitary transform R as shown in Formula 18.

$$S = RY \quad \text{[Formula 18]}$$

Output signals where the D component is 0 need not be considered and are therefore omitted from this calculation. The D' and R' are formed from the distortion component D and unitary transform R excluding the rows where the component of D is 0. For example if there are two non-zero components of D, then D' is the 2-dimensional vector, and R' is the 2×N matrix. The relation with B then becomes that shown in Formula 19.

$$D' = R'B \quad \text{[Formula 19]}$$

Here, R' is not a square matrix, and there are infinite solutions of B satisfying the Formula 19. The Formula 19 is thereupon converted to Formula 20.

$$D' = R' \text{diag}[W]^{-1} \text{diag}[W]B \quad \text{[Formula 20]}$$

Here, the diag [W] expresses a diagonal matrix possessing each element of W as diagonal elements. The diag [W]B is then found as shown in Formula 21.

$$\text{diag}[W]B = (R'\text{diag}[W]^{-1})^{\#}D' \quad \text{[Formula 21]}$$

Here, the # expresses a matrix called a pseudo inverse matrix or a generalized inverse matrix. The diag [W]B found in Formula 21 is the smallest squared norm among those satisfying Formula 20. In other words, the value shown in Formula 22 is the smallest.

$$\sum_{k=0}^{N-1} |(\text{diag}[W]B)_k|^2 = \sum_{k=0}^{N-1} \frac{|B_k|^2}{SNR_k} \quad \text{[Formula 22]}$$

This result shows that the total sum of ratio between the SNR and power of the distortion signal added to each communication mode over all modes becomes the smallest, and shows that this is a good method for keeping degradation in transmission characteristics low. B can be found from Formula 23.

$$B = \text{diag}[W]^{-1}(R'\text{diag}[W]^{-1})^{\#}D' \quad \text{[Formula 23]}$$

The above procedure is capable of suppressing peaks but in some cases may generate a new peak. To avoid new peaks, the above procedure can be performed multiple times to generate an output signal.

Communication modes may be present that have no signals. OFDM for example has subcarriers not utilized for communication outside the signal frequency band, and MIMO purposely set with communication modes not used in communication. In such cases, the degradation in transmission characteristics can be suppressed by concentrating the distortion at these no-signal locations. The weight calculation unit 105 can effectively suppress degradation by setting a large weight value in communication modes with no signal.

If jointly using a transmitter/receiver antenna in the TDD method, then the spatial propagation characteristics are the same in transmit/receive so that the receive power of the receive signal can be utilized by the channel quality acquisition unit as quality information.

If the number N of communication modes is large then a large processing load is required for the calculation in Formula 23. The calculation is simple if D' in Formula 23 is only one component. Therefore if there are multiple components in D', you can calculate as if D' has only one component for each non-zero component and then sum up all of them so that an approximate solution can be found with a small processing load.

The transceiver 115 in FIG. 9 which is receiving the data may utilize a structure identical to the above wireless communication apparatus or may utilize a different structure.

The signal strength of the wireless signals in each communication mode received from the transceiver 115 in FIG. 9 may be utilized as channel quality information, and that signal strength can also be utilized as a substitute for the SNR. The signal strength can be utilized because the attenuation in signal strength during propagation of the wireless communication from the transceiver 114 to transceiver 115 is equivalent to the attenuation in signal strength during propagation from the transceiver 115 to transceiver 114.

The channel quality acquisition unit 104 may acquire channel quality information via the feedback from the data receive terminals. One technique for acquiring channel quality information is detecting the receive power of the MIMO or OFDM channel estimation training signal that was sent from the data receive terminals.

Second Embodiment

In this embodiment, the weight of communication modes of good communication quality is set to 0, and the weight of communication modes of bad quality is set to 1 in the weight calculation unit 105 of the first embodiment. Communication modes can for example be arrayed in the order of good communication quality (high SNR) and if the weight of the good half of the communication mode is set to 0, and the weight of the bad half of the communication modes is set to 1, then no distortion signals need be distributed to the modes in the half with good communication quality, and equivalent distortion signals allotted to modes in the half with bad quality. This method yields the effect that calculation be easily completed.

In the description of the above example, the communication modes were distributed into modes with good communication quality and modes with bad communication quality. However, the parameters for the distribution ratio can be set as needed by the communication system designers. The same distortion signal can be distributed as weight of 1 allotted to all modes with bad communication quality. However the weight allotment to modes with bad quality may also be set identical to the example in the first embodiment.

Third Embodiment

Figure 3:
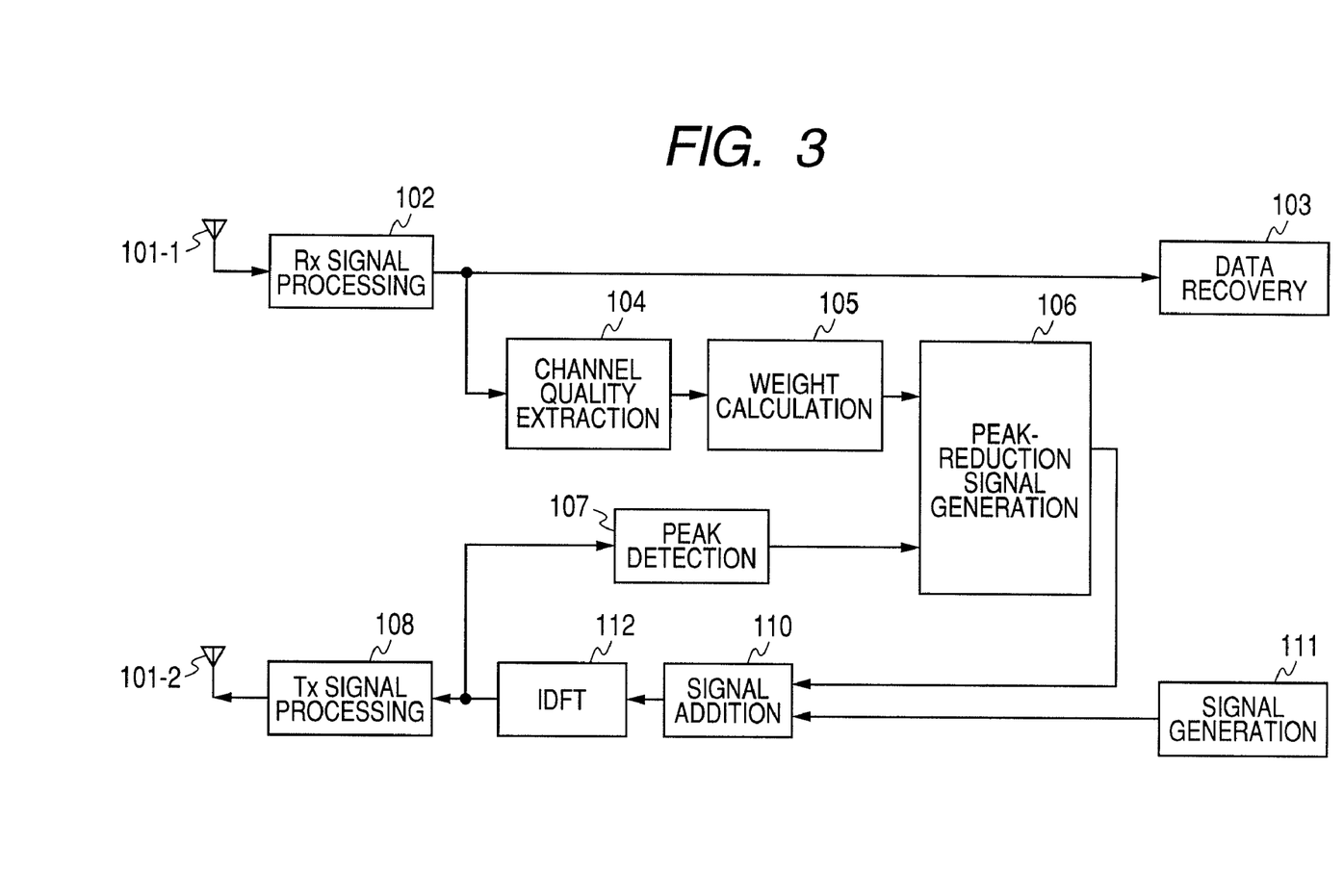
FIG. 3 is a block diagram showing the structure for the OFDM wireless communication apparatus of this invention.

FIG. 2 shows the structure of the OFDM wireless communication apparatus of this invention. This wireless communication apparatus contains a receiving antenna 101-1, a transmitting antenna 101-2, a receive (Rx) signal processing unit 102, a data recovery unit 103, a channel quality acquisition unit 104, a weight calculation unit 105, a peak suppression signal generation unit 106, a peak detection unit 107, a transmit (Tx) signal processing unit 108, an inverse discrete Fourier transform (IDFT) unit 112, a signal addition unit 110, and a signal generation unit 111.

The receiving antenna 101-1 receives the signal. The receiving antenna 101-1 need not be one unit and may include multiple units.

The receive (hereafter Rx) signal processing unit 102 converts the received analog signal to a digital signal. The Rx signal processing unit 102 includes a filter for removing noise and interference outside the signal band from the analog data, a down converter for converting the received signal to a baseband signal, a low-noise amplifier for amplifying the power of the received signal, and an analog-to-digital converter (ADC).

The data recovery unit 103 restores the digital signal obtained from the Rx signal processing unit 102 to the data that was transmitted from the transmit source.

The channel quality acquisition unit 104 acquires the channel quality.

The weight calculation unit 105 calculates the weight to allot for the peak suppression signal to be added to each mode according to the channel quality information acquired by the channel quality acquisition unit 104.

The signal generation unit 111 generates a signal for each communication mode.

The IDFT unit 112 converts each communication mode signal input by way of the signal addition unit 110 by discrete Fourier transform into a signal for output from the antenna.

The peak detection unit 107 detects signals whose amplitude is larger than a specified threshold value from among the converted signals. A distortion component for setting this signal amplitude below the threshold amplitude is conveyed to the peak suppression signal generation unit 106.

The peak suppression signal generation unit 106 generates a peak suppression signal from the distortion component calculated by the peak detection unit 107 and the weight calculated by the weight calculation unit 105.

The signal addition unit 110 adds this generated peak suppression signal to the signal from the signal generation unit 111.

The Tx signal processing unit 108 utilizes these procedures to convert the peak-suppressed digital signal to an analog signal. The Tx signal processing unit 108 contains a DAC, a power amplifier, an up-converter for converting the baseband signal to an RF frequency, and a filter for removing unwanted (RF) emissions outside the signal band.

The transmitting antenna 101-2 converts the analog signal converted by the Tx signal processing unit 108 into electromagnetic waves. The transmitting antenna need not be one unit and may include multiple units.

The receiving antenna 101-1 and the transmitting antenna 101-2 may be structure jointly using a switch and a duplexer.

This embodiment shows an example applying this invention to the OFDM wireless communication apparatus. In the OFDM the unitary transform of the first embodiment is by IDFT, and after conversion the signal becomes a time domain signal waveform.

Figure 4:
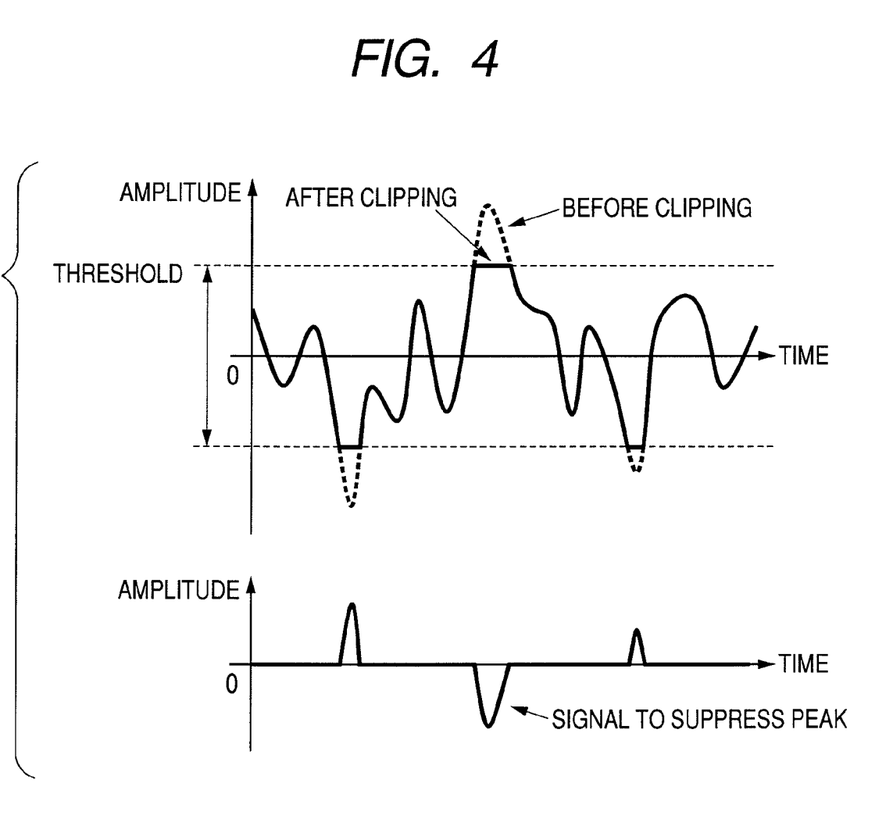
FIG. 4 is a graph showing the method for generating the distortion component for suppressing the peak from the time domain signal waveform in the OFDM method.

The peak detection unit 107 generates a distortion component for suppressing the peak of the time domain signal waveform to a specified threshold value. FIG. 4 is a graph showing the method for generating the distortion component. The horizontal axis is the time and the vertical axis is the amplitude.

This signal is essentially a complex signal but here it is treated as a real number. The upper graph shows the signal (Before Clipping) after performing IDFT, and the signal (After Clipping) whose amplitude was suppressed because the amplitude exceeded a specified threshold. The distortion component is the remainder after subtracting the signal prior to suppression from the signal after suppression. This distortion signal is conveyed from the peak detection unit 107 to the peak suppression signal generation unit 106.

The OFDM contains a subcarrier not utilized for communication and that is outside the signal frequency band so the weight calculation unit 105 can set a large weight so that the distortion concentrates there.

Fourth Embodiment

Figure 5:
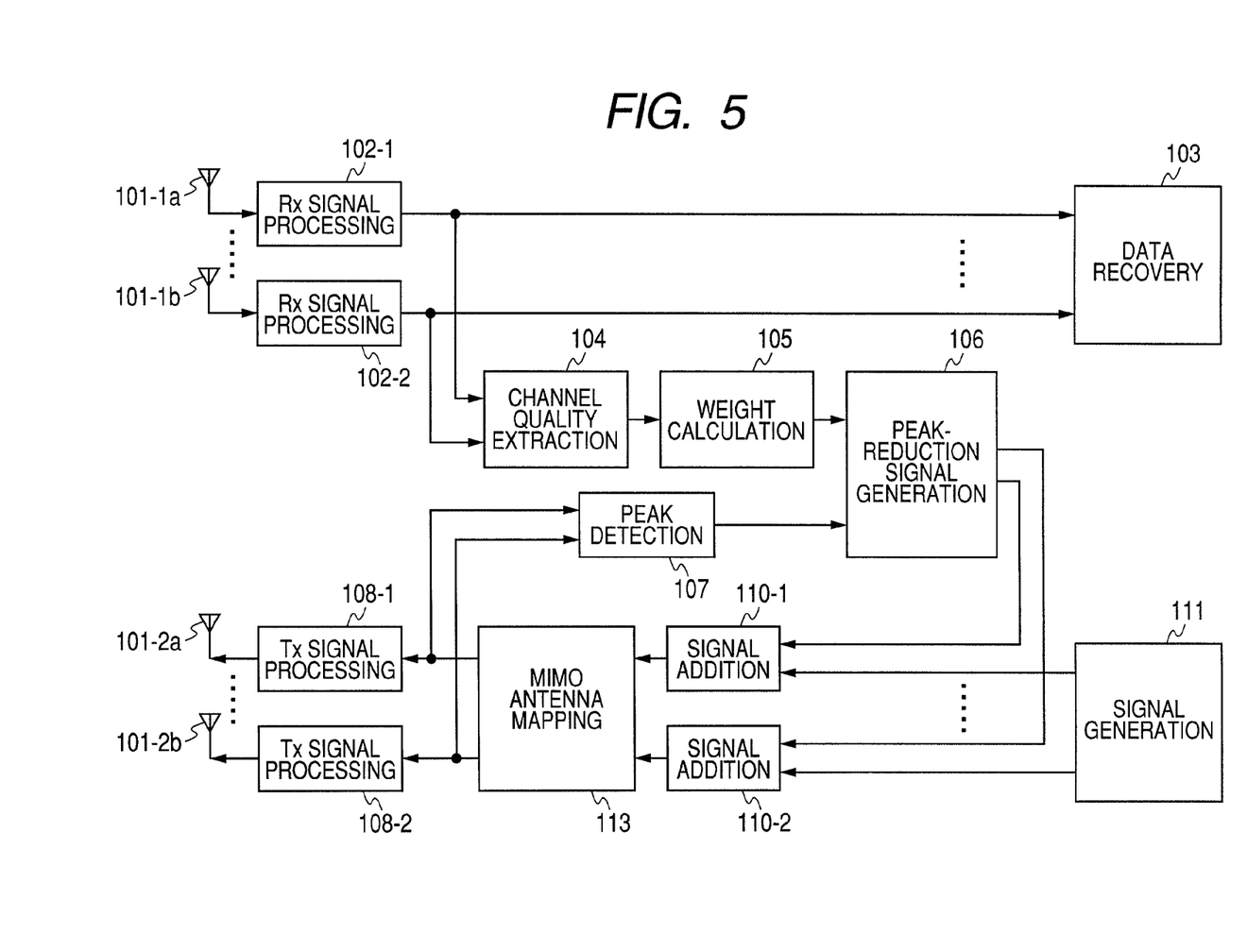
FIG. 5 is a block diagram showing the structure when applying the MIMO wireless communication apparatus to this invention.

FIG. 3 shows the structure of the MIMO wireless communication apparatus of this invention. This wireless communication apparatus contains a receiving antenna 101-1, a transmitting antenna 101-2, a receive (Rx) signal processing unit 102, a data recovery unit 103, a channel quality acquisition unit 104, a weight calculation unit 105, a peak suppression signal generation unit 106, a peak detection unit 107, a transmit (Tx) signal processing unit 108, a MIMO antenna mapping unit 113, a signal addition unit 110, and a signal generation unit 111.

The receiving antenna 101-1 receives the signal.

The receive (hereafter Rx) signal processing unit 102 converts the received analog signal to a digital signal. The Rx signal processing unit 102 includes a filter for removing noise and interference outside the signal band from the analog data, a down converter for converting the received signal to a baseband signal, a low-noise amplifier for amplifying the power of the received signal, and an analog-to-digital converter (ADC).

The MIMO utilizes multiple antennas so multiple receive antenna 101-1 and the Rx signal processing unit 102 in FIG. 3 are actually multiple units.

The data recovery unit 103 restores the digital signal obtained from the Rx signal processing unit 102, to the data that was transmitted from the transmit source.

The channel quality acquisition unit 104 acquires the channel quality.

The weight calculation unit 105 calculates the weight to allot for the peak suppression signal to be added to each communication mode, according to the acquired channel quality information.

The signal generation unit 111 generates a signal for each communication mode.

The MIMO antenna mapping unit 113 converts each generated communication mode signal input from the signal addition unit 110 by unitary transform, into a signal for output from the antenna.

The peak detection unit 107 detects signals whose amplitude is larger than a specified threshold value from among the converted signals. A distortion component for setting this signal amplitude below the threshold amplitude is conveyed to the peak suppression signal generation unit 106.

The peak suppression signal generation unit 106 generates a peak suppression signal from the distortion component calculated by the peak detection unit 107 and the weight calculated by the weight calculation unit 105.

The signal addition unit 110 adds this generated peak suppression signal to the signal from the signal generation unit 111.

The Tx signal processing unit 108 utilizes these procedures to convert the peak-suppressed digital signal to an analog signal. The Tx signal processing unit 108 contains a DAC, a power amplifier, an up-converter for converting the baseband signal to an RF frequency, and a filter for removing unwanted (RF) emissions outside the signal band.

The transmitting antenna 101-2 converts the analog signal converted by the Tx signal processing unit 108 into electromagnetic waves. The transmitting antenna need not be one unit and may include multiple units.

Just the same as with the RX antenna 101-1 and receive signal processor unit 102, the TX antennas 101-2 and transmit signal processing units 108 represented here are multiple units. The receiving antenna 101-1 and the transmitting antenna 101-2 may be joint structure using a switch and a duplexer.

In order to ensure that transmission characteristics are stable, the MIMO may possess several communication mode that carry no signals. In that case, the weight calculation unit 105 may set a large weight in communication modes with no signals, so that distortion is concentrated in the communication modes with no signals.

The MIMO may apply different transmit signal power to each communication mode. In this case, the difference in transmit power might affect the SNR of the communication mode so the transmit power ratio of the communication power modes is preferably reflected in the SNR calculation made by the weight calculation unit.

Figure 8:
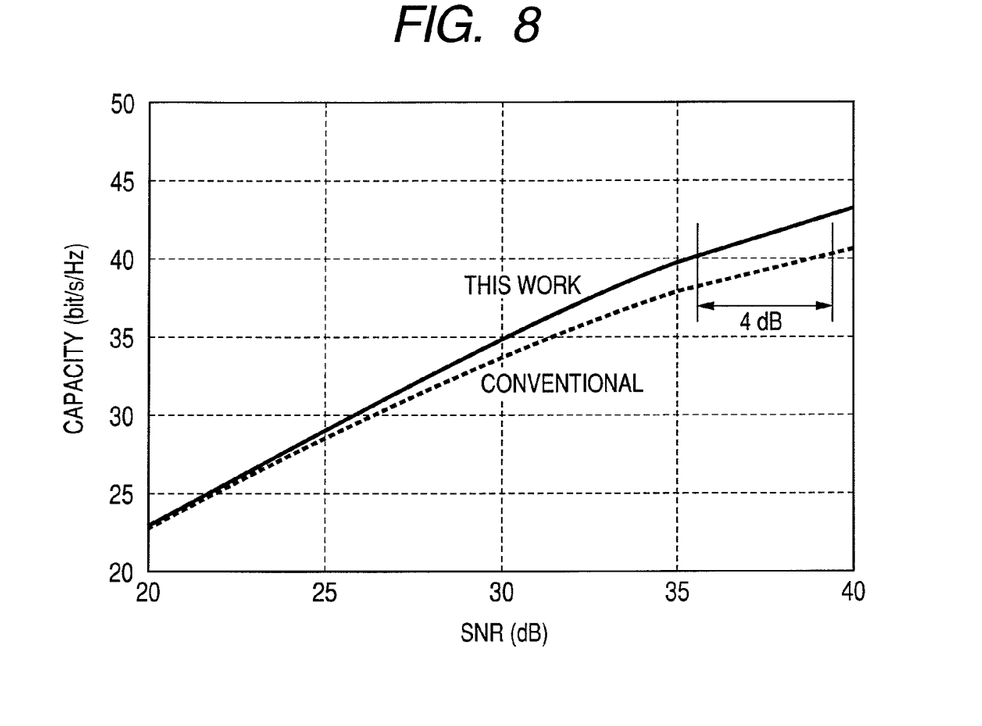
FIG. 8 is a graph for comparing the effect of the present invention and the method of the related art.

FIG. 8 is a graph comparing the method utilized in the embodiment with the method of the related art for suppressing the peak without taking the channel quality into consideration. This graph shows the transmission capacity obtained in a simulation of eigen mode transmission by a single carrier 4×4 MIMO.

The peak suppression threshold was set to a power 7 dB higher than the mean power, and the Shannon capacity is graphed by regarding the distortion occurring in each mode as noise. The graph shows that under this condition, the invention achieved a 4 dB improvement in gain at an SNR equal to 35-40 dB compared to the method of the related art.

Fifth Embodiment

Figure 6:
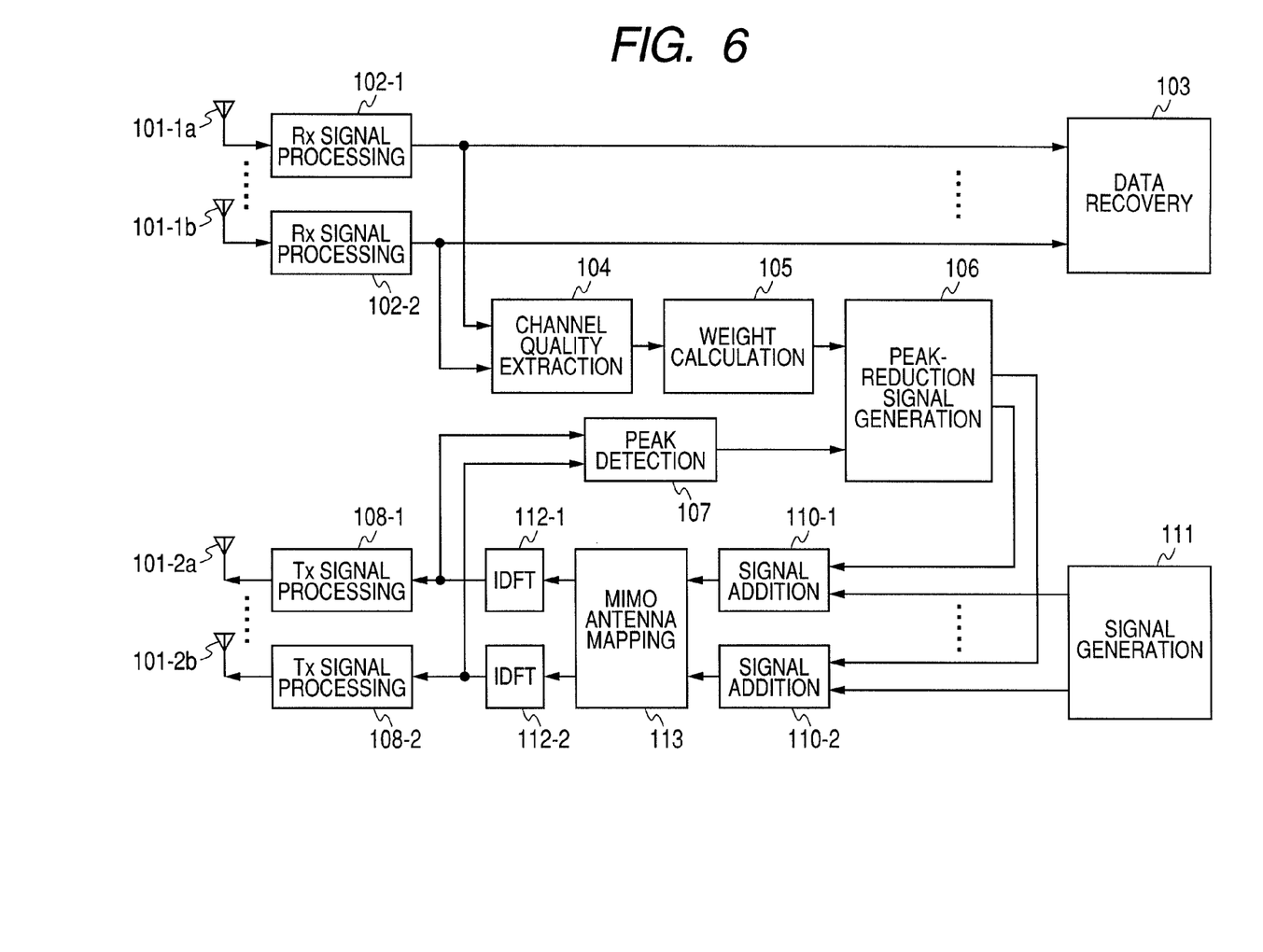
FIG. 6 is a block diagram showing the structure when applying the MIMO-OFDM wireless communication apparatus to this invention.

FIG. 6 shows the structure of the MIMO-OFDM wireless communication apparatus of this invention. This wireless communication apparatus contains a receiving antenna 101-1, a transmitting antenna 101-2, a receive (Rx) signal processing unit 102, a data recovery unit 103, a channel quality signal generation unit 106, a peak detection unit 107, a transmit (Tx) signal processing unit 108, an inverse discrete Fourier transform (IDFT) unit 112, a MIMO antenna mapping unit 113, a signal addition unit 110, and a signal generation unit 111.

The receiving antenna 101-1 receives the signal.

The receive (hereafter Rx) signal processing unit 102 converts the received analog signal to a digital signal. The Rx signal processing unit 102 includes a filter for removing noise and interference outside the signal band from the analog data, a down converter for converting the received signal to a baseband signal, a low-noise amplifier for amplifying the power of the received signal, and an analog-to-digital converter (ADC).

The MIMO utilizes multiple antennas so multiple receive antenna 101-1 and the Rx signal processing unit 102 in FIG. 3

The data recovery unit 103 restores the digital signal obtained from the Rx signal processing unit 102, to the data that was transmitted from the transmit source.

The channel quality acquisition unit 104 acquires the channel quality.

The weight calculation unit 105 calculates the weight to allot for the peak suppression signal to be added to each communication mode, according to the acquired channel quality information.

The signal generation unit 111 generates a signal for each communication mode.

The MIMO antenna mapping unit 113 converts each generated communication mode signal input by way of the signal addition unit 110 by unitary transform and by discrete Fourier transform in the inverse discrete Fourier transform unit (IDFT) 112, into a signal for output from the antenna.

The peak detection unit 107 detects signals whose amplitude is larger than a specified threshold value from among the converted signals. A distortion component for setting this signal amplitude below the threshold amplitude is conveyed to the peak suppression signal generation unit 106.

The peak suppression signal generation unit 106 generates a peak suppression signal from the distortion component calculated by the peak detection unit 107 and the weight calculated by the weight calculation unit 105.

The signal addition unit 110 adds this generated peak suppression signal to the signal from the signal generation unit 111.

The Tx signal processing unit 108 utilizes these procedures to convert the peak-suppressed digital signal to an analog signal. The Tx signal processing unit 108 contains a DAC, a power amplifier, an up-converter for converting the baseband signal to an RF frequency, and a filter for removing unwanted (RF) emissions outside the signal band.

The transmitting antenna 101-2 converts the analog signal that converted by the Tx signal processing unit 108, into electro-magnetic waves. The transmitting antenna need not be one unit and may include multiple units.

Just the same as with the RX antenna 101-1 and receive signal processor unit 102, the TX antennas 101-2 and transmit signal processing unit 108 represented here are multiple units. The receiving antenna 101-1 and the transmitting antenna 101-2 may be a joint structure using a switch and a duplexer.

In MIMO-OFDM wireless communication, the unitary transformation is a combination of inverse discrete Fourier transforms and MIMO antenna mapping so this embodiment contains both an MIMO antenna mapping unit 113 and an IDFT unit 112.

Sixth Embodiment

Figure 7:
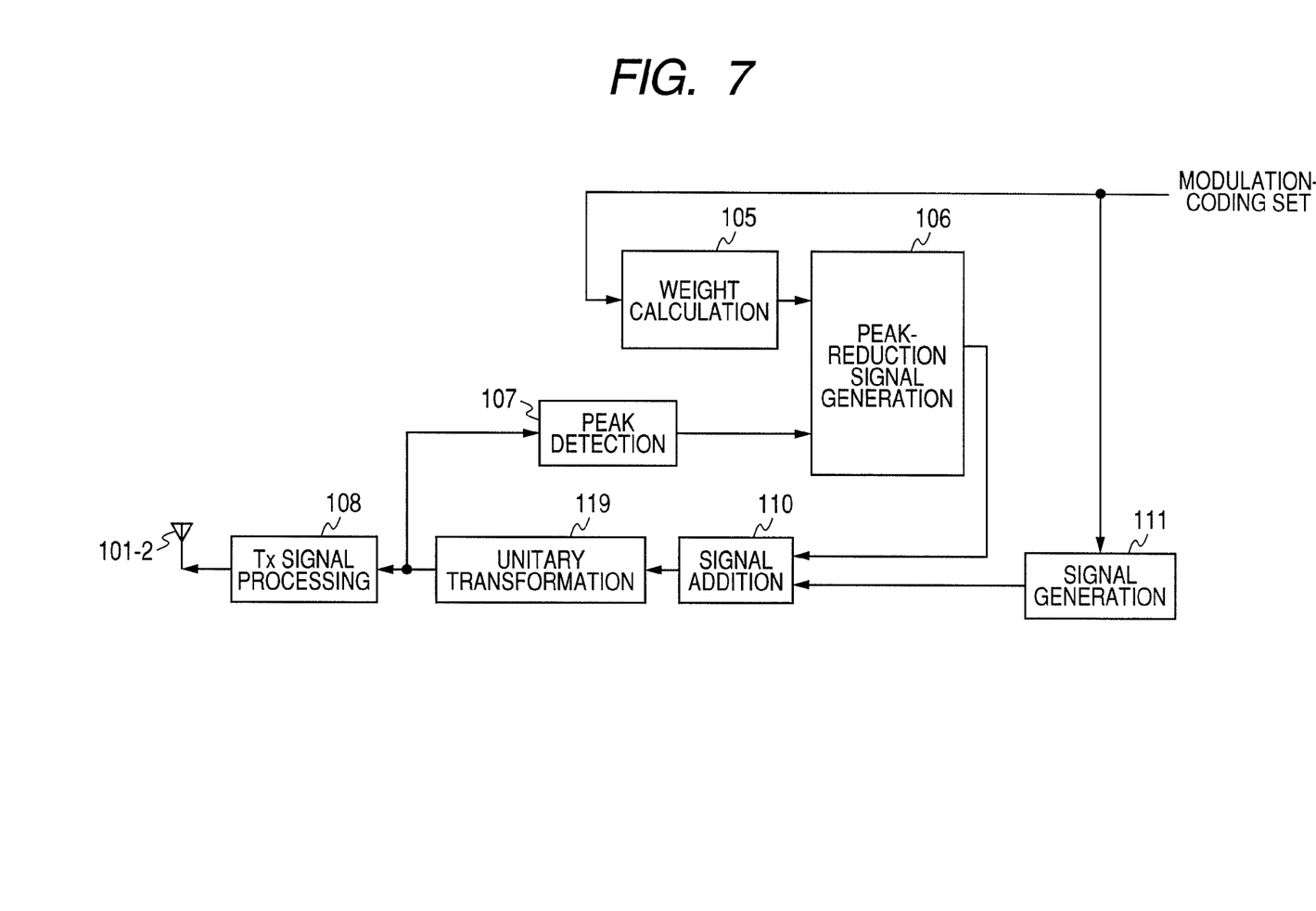
FIG. 7 is a block diagram showing the structure of the wireless communication apparatus utilizing a modulation-coding set as the channel quality information in this invention.

This embodiment is a wireless communication apparatus structured as shown in FIG. 7 utilizing a modulation-coding set as channel quality information for each communication mode in the first embodiment. This wireless communication apparatus includes a weight calculation unit 105, a peak suppression signal generation unit 106, a peak detection unit 107, a Tx signal processing unit 108, a unitary transformation unit 109, a signal addition unit 110, and a signal generation unit 111. The block on the receiver processing unit side in this embodiment not contributing to the invention is not shown in FIG. 7.

The weight calculation unit 105 calculates the weight to allot for the peak suppression signal to be added to each The signal generation unit 111 generates a signal for each communication mode.

The unitary transformation unit 109 converts each communication mode signal input by way of the signal addition unit 110 into a signal for output from the antenna.

The peak detection unit 107 detects signals whose amplitude is larger than a specified threshold value from among the converted signals. A distortion component for setting this signal amplitude below the threshold amplitude is conveyed to the peak suppression signal generation unit 106.

The peak suppression signal generation unit 106 generates a peak suppression signal from the distortion component calculated by the peak detection unit 107 and the weight calculated by the weight calculation unit 105.

The signal addition unit 110 adds this generated peak suppression signal to the signal from the signal generation unit 111.

The Tx signal processing unit 108 utilizes these procedures to convert the peak-suppressed digital signal to an analog signal. The Tx signal processing unit 108 contains a DAC, a power amplifier, an up-converter for converting the baseband signal to an RF frequency, and a filter for removing unwanted (RF) emissions outside the signal band.

The transmitting antenna 101-2 converts the analog signal converted by the Tx signal processing unit 108 into electro-magnetic waves. The transmitting antenna need not be one unit and may include multiple units.

The modulation-coding set (MCS) indicates a method for modulating each communication mode and an error correcting code. Communication devices or communication methods for adaptive modulation are controlled so as to utilize the modulation method having the highest speed among MCS capable of communicating without errors. Modulating methods used with high communication speeds require a high SNR and therefore the MCS can be utilized as the channel quality (SNR index). After deciding the modulation method and error correcting code, the SNR needed for receiving can then be set so that the weight can then be calculated from that SNR.

The method in this embodiment is capable of calculating the allowable SNR so the distortion component can be reduced in other modes by allotting a distortion component nearest the allowable value to the applicable communication mode even if the actual SNR in the communication mode is higher than the allowable value for the modulation method and error correcting code (namely, in cases where the noise is small). Even in the above method, only the allowable distortion component is allotted to each mode so there is little effect on the applicable mode.

What is claimed is:

1. A wireless communication apparatus comprising:
a signal generation unit for generating transmit signals;
a converter unit for converting the transmit signals;
a peak detector unit for detecting a transmit signal with a signal amplitude larger than a specified value from among the converted transmit signals, and generating a distortion component for setting the signal amplitude of the detected transmit signal to within a specified value;
a receive signal processor unit for performing analog-to-digital conversion of the receive signal received from the antenna;
a channel quality acquisition unit for acquiring channel quality information from signals output from the receive signal processor unit;
a weight calculation unit for calculating the weight of a peak suppression signal to add to the transmit signal based on the channel quality information;
a peak suppression signal conversion unit for converting the distortion signal generated by the peak detector into a peak suppression signal according to the weight calculated by the weight calculation unit;
a signal adder unit for adding the peak suppression signal output from the conversion unit, to the transmit signal output from the signal generation unit; and
a transmit signal processor unit to convert the transmit signal added with the peak suppression signal in the converter unit, and perform analog-to-digital conversion of the transmit signal to which the converted peak suppression signal was added, and output this signal to the antenna.

2. The wireless communication apparatus according to claim 1,
wherein the conversion unit performs unitary transformation.

3. The wireless communication apparatus according to claim 2,
wherein the signal generation unit generates multiple transmit signals arrayed along the frequency axis, and
wherein the conversion unit converts the multiple transmit signals arrayed along the frequency axis to multiple transmit signals arrayed along the time axis.

4. The wireless communication apparatus according to claim 2,
wherein the unitary transformation unit superimposes the signals by the OFDM method.

5. The wireless communication apparatus according to claim 2,
wherein the antenna is multiple transmit antennas, and
wherein the unitary transformation unit superimposes the signals by the MIMO method.

6. The wireless communication apparatus according to claim 5,
wherein the unitary transformation unit superimposes the signals by the OFDM method.

7. The wireless communication apparatus according to claim 1,
wherein the channel quality information is channel state information (CSI) or modulation code set (MCS).

8. The wireless communication apparatus according to claim 1,
wherein the weight calculation unit calculates a large weight for transmit signals with bad channel quality.

9. The wireless communication apparatus according to claim 8,
wherein the weight calculation unit calculates a small weight for transmit signals with good channel quality.

10. The wireless communication apparatus according to claim 8,
wherein the weight calculation unit does not calculate a weight for transmit signals with good channel quality.

11. The wireless communication apparatus according to claim 1,
wherein the weight calculation unit calculates the weight so that the distortion component is smaller than the noise component in each transmit signal.

12. A wireless communication method comprising:
converting a transmit signal;
detecting a transmit signal with a signal amplitude larger than a specified value from among the converted transmit signals;
generating a distortion component for setting the signal amplitude of the detected transmit signal within a specified value;
acquiring channel quality information from the received signal;
calculating the weight of a peak suppression signal to add to the transmit signal based on the channel quality information;
converting the distortion signal generated by the operation of generating a distortion component into a peak suppression signal according to the weight calculated by the operation of calculating the weight;
adding the peak suppression signal to the transmit signal; and
outputting the transmit signal added with the peak suppression signal to the antenna.

13. The wireless communication method according to claim 12
wherein the operation of converting performs unitary transformation.

14. The wireless communication method according to claim 13,
wherein the transmit signals are multiple transmit signals arrayed along the frequency axis, and
wherein the converted transmit signals are multiple transmit signals arrayed along the time axis.

15. The wireless communication method according to claim 12,
wherein the channel quality information is channel state information (CSI) or modulation code set (MCS).

16. The wireless communication method according to claim 12,
wherein a large weight is calculated for transmit signals with bad channel quality.

17. The wireless communication method according to claim 12,
wherein a weight is calculated so that the distortion component is smaller than the noise component in each transmit signal.

18. A peak suppression method comprising:
performing unitary transformation of multiple signals arrayed along the frequency axis and setting the multiple signals along the time axis;
detecting signals with a signal amplitude larger than a specified value from among the multiple signals along the time axis;
generating a distortion component for setting the signal amplitude of the detected signal within a specified value;
generating a weight for peak suppression signal to add to the multiple signals based on the pre-acquired channel quality information;
converting the distortion signal generated by the operation of generating a distortion component into a peak suppression signal according to the weight calculated by the operation of calculating the weight; and
adding the peak suppression signal to the multiple signals arrayed along the frequency axis.

* * * * *